(12) United States Patent
Kurisu et al.

(10) Patent No.: US 12,536,272 B2
(45) Date of Patent: Jan. 27, 2026

(54) INFORMATION PROCESSING DEVICE FOR VEHICLE

(71) Applicant: TOYOTA JIDOSHA KABUSHIKI KAISHA, Toyota (JP)

(72) Inventors: Satofumi Kurisu, Nagoya (JP); Kosuke Ohashi, Kiyosu (JP); Ryo Anan, Toyota (JP); Ryota Nakabayashi, Nagoya (JP); Nobutaka Suzuki, Toyota (JP); Kiyoto Suzuki, Tokoname (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 18/814,652

(22) Filed: Aug. 26, 2024

(65) Prior Publication Data

US 2025/0111038 A1    Apr. 3, 2025

(30) Foreign Application Priority Data

Sep. 28, 2023    (JP) ................ 2023-167747

(51) Int. Cl.
*G06F 21/53* (2013.01)
*G06F 21/78* (2013.01)

(52) U.S. Cl.
CPC .............. *G06F 21/53* (2013.01); *G06F 21/78* (2013.01); *G06F 2221/2105* (2013.01)

(58) Field of Classification Search
None
See application file for complete search history.

(56) References Cited

U.S. PATENT DOCUMENTS

| | | | |
|---|---|---|---|
| 10,635,824 B1 * | 4/2020 | Triandopoulos | G06F 21/602 |
| 10,970,393 B1 * | 4/2021 | Stiles | G06F 21/554 |
| 11,934,812 B2 * | 3/2024 | Mukhtar | G06F 8/44 |
| 2017/0195365 A1 * | 7/2017 | Basson | H04L 63/20 |
| 2018/0107838 A1 * | 4/2018 | Amarendran | G06F 16/122 |
| 2022/0179960 A1 * | 6/2022 | Spangler | H04L 9/3239 |
| 2022/0358062 A1 * | 11/2022 | Panzica | G06F 12/0292 |
| 2023/0094125 A1 | 3/2023 | Rogers et al. | |

FOREIGN PATENT DOCUMENTS

JP    2023-47265 A    4/2023

* cited by examiner

*Primary Examiner* — Brandon Hoffman
(74) *Attorney, Agent, or Firm* — Oblon, McClelland, Maier & Neustadt, L.L.P.

(57) ABSTRACT

An unprotected area of a storage stores a monitoring application. A protected area of the storage stores a duplicate application that is a copy of the monitoring application at a point in time when the monitoring application was stored in the unprotected area. Based on an execution signal of the monitoring application, a CPU stores, as first data in a RAM, a copy of a source code included in the monitoring application. The CPU also executes the monitoring application based on the first data. Based on the execution signal, the CPU stores, as second data in the RAM, the copy of the source code included in the duplicate application. During execution of the monitoring application, the CPU stops execution of the monitoring application when a discrepancy is detected between the first data and the second data.

4 Claims, 3 Drawing Sheets

INFORMATION PROCESSING DEVICE FOR VEHICLE

CROSS-REFERENCE TO RELATED APPLICATIONS

This application is based upon and claims the benefit of priority from prior Japanese Patent Application No. 2023-167747, filed on Sep. 28, 2023, the entire contents of which are incorporated herein by reference.

BACKGROUND

1. Field

The present disclosure relates to an information processing device for a vehicle.

2. Description of Related Art

Japanese Laid-Open Patent Publication No. 2023-047265 discloses an information processing device that includes a memory. The memory contains a protected area. Access to the protected area is restricted. The protected area is safeguarded against unauthorized access.

Even if access to the memory is restricted as described in Japanese Laid-Open Patent Publication No. 2023-047265, there is still a risk that the applications stored in the memory could be tampered with when the memory is subject to unauthorized access from external sources. If an application is tampered with, the application may execute improper operations. To prevent such situations, there is a need for technology that can detect tampering when an application has been altered.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides an information processing device for a vehicle. The information processing device includes an execution unit that includes processing circuitry, a first memory that stores an application executable by the processing circuitry, and a second memory that temporarily stores data generated when the processing circuitry executes the application. The first memory includes a protected area that requires a specific access permission for writing and an unprotected area that does not require a specific access permission for writing. The unprotected area stores a monitoring application that is subject to monitoring. The protected area stores a duplicate application that is a copy of the monitoring application at a point in time when the monitoring application was stored in the unprotected area. The processing circuitry is configured to, when obtaining an execution signal of the monitoring application, perform storing, based on the execution signal, as first data in the second memory, a copy of a source code included in the monitoring application stored in the unprotected area, and executing the monitoring application based on the first data stored in the second memory, storing, based on the execution signal, as second data in the second memory, a copy of a source code included in the duplicate application stored in the protected area, comparing, during execution of the monitoring application, the first data and the second data stored in the second memory with each other, and stopping execution of the monitoring application when detecting a discrepancy between the first data and the second data.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An information processing device for a vehicle according to an embodiment will now be described with reference to the drawings.

Overall Configuration of Vehicle

Figure 1:
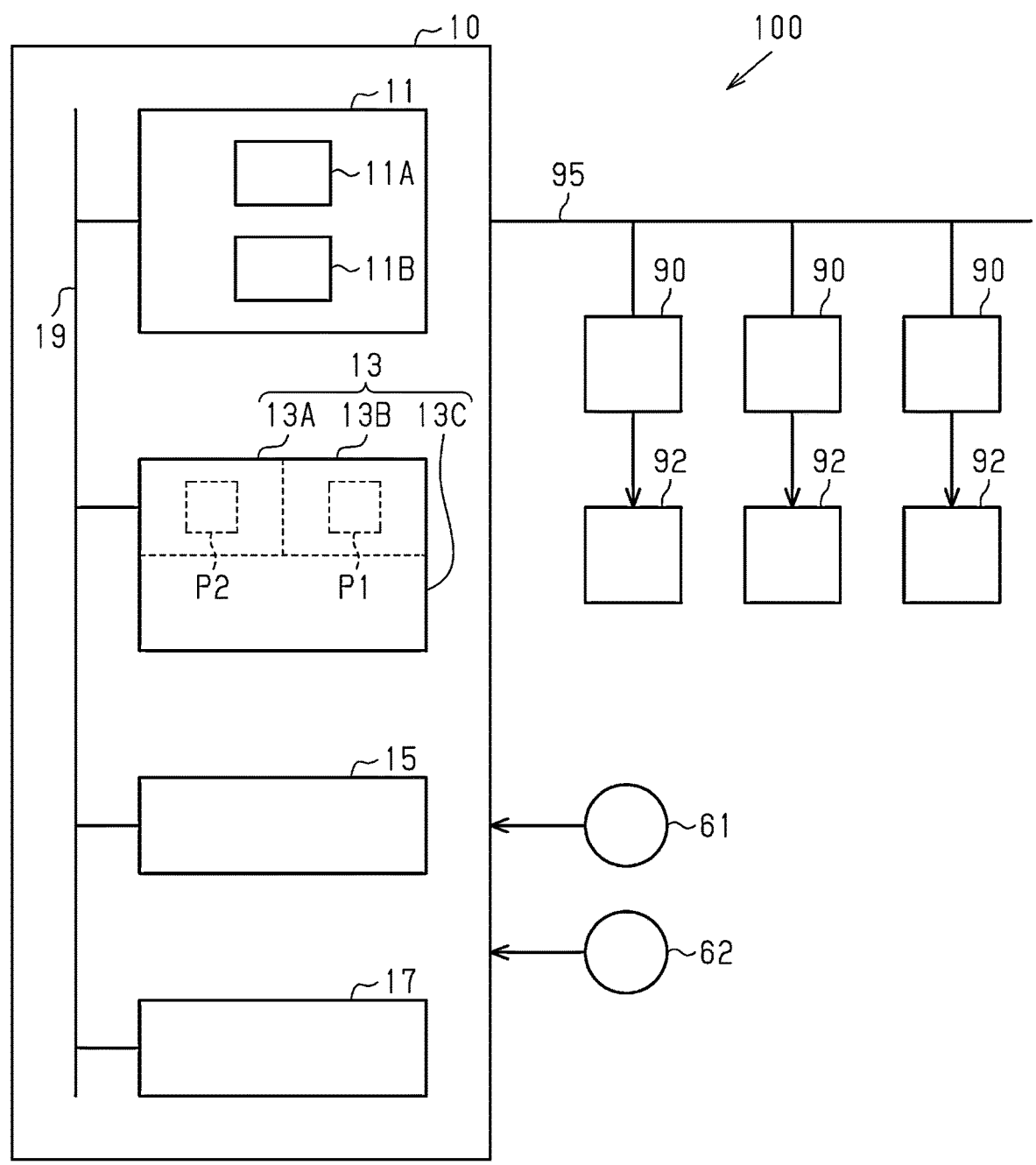
FIG. 1 is a schematic diagram showing the configuration of a vehicle.

As shown in FIG. 1, the vehicle 100 includes a central controller 10 and specific controllers 90. The central controller 10 controls the entire vehicle 100 in a centralized manner. Each specific controller 90 targets and controls a specific one of vehicle on-board devices 92. FIG. 1 representatively shows three of the vehicle on-board devices 92. The vehicle on-board devices 92 include an engine that serves as a drive source for the vehicle 100, a brake device that applies braking force to the vehicle 100, a steering device that adjusts the steering angle of the vehicle 100, and a touch panel display. The display is located in the passenger compartment of the vehicle 100. The vehicle on-board devices 92 include many other devices. The central controller 10 and the specific controllers 90 can communicate with each other via an external bus 95.

The vehicle 100 include information acquisition devices 61. FIG. 1 representatively shows one of the information acquisition devices 61. The information acquisition device 61 includes a device that detects the traveling state of the vehicle 100. The information acquisition devices 61 is, for example, a vehicle speed sensor that detects the traveling speed of the vehicle 100. The information acquisition device 61 includes a device that detects surrounding information or position information of the vehicle 100. Examples of the information acquisition device 61 include a camera that captures images of the surroundings of the vehicle 100 and a position receiver that obtains information related to the current position coordinates of the vehicle 100 from a global positioning satellite. Each information acquisition device 61 outputs a signal corresponding to the information acquired by itself to the central controller 10.

The vehicle 100 includes an operation switch 62. The operation switch 62 is located in the passenger compartment of the vehicle 100. For example, the operation switch 62 is provided on the steering handle. The operation switch 62 and the display are included in an input device. Each input device outputs information to the central controller 10 based on an operation performed by the occupant. The occupant can input various instructions into the central controller 10 through each input device. Examples of various instructions include those related to the execution of the application, which will be discussed below.

The central controller 10 is an information processing device for the vehicle 100. The central controller 10 includes a CPU 11, a storage 13, a RAM 15, and a communication module 17. The CPU 11 is an execution unit. The storage 13 is an electrically rewritable non-volatile memory. The storage 13 is a first memory. The storage 13 stores, in advance, various programs that describe the processes to be executed by the CPU 11, as well as various data necessary for the CPU 11 to execute these programs. Examples of the programs stored in the storage 13 include applications used to control or manage the vehicle 100. In other words, the storage 13 stores multiple applications that can be executed by the CPU 11. The application includes a source code, which is a set of instructions describing the processing content. Additionally, each application is assigned a pre-allocated ID. The RAM 15 is a volatile memory. The RAM 15 is the second memory. The RAM 15 temporarily stores the data generated when CPU 11 executes an application. The communication module 17 is a communication circuit designed to perform wireless communication with external entities via an external communication network. The CPU 11, the storage 13, the RAM 15, and communication module 17 are capable of communicating with each other via the internal bus 19.

Details of Storage

The storage unit 13 includes a protected area 13A, an unprotected area 13B, and another area 13C. These three memory areas are pre-allocated to the storage 13 at the shipment of the vehicle 100. Writing to the protected area 13A requires specific access permissions. In the present embodiment, the specific access permissions are administrator privileges. In other words, writing to the protected area 13A is possible only when an operator, such as one at dealership, executes a process on the CPU 11 with administrator privileges. To execute processes on the CPU 11 with administrator privileges, the operator needs to enter a predetermined password from outside the central controller 10 into the central controller 10. Administrative privileges refer to the authority that permits nearly all operations within the central controller 10. These privileges are also referred to as root privileges. Writing to the unprotected area 13B does not require the aforementioned specific access permissions. However, in the unprotected area 13B, writing is possible only when the CPU 11 functions as a predetermined specific functional unit. The specific functional unit in the present embodiment is the management unit 11B, which will be described later. Thus, the unprotected area 13B is also subject to specific access permissions for writing. By applying access permissions, unauthorized external access is prevented not only for the protected area 13A but also for the unprotected area 13B. The protected area 13A has a higher security level than the unprotected area 13B because it requires a password input from an external source for writing. The other area 13C is a memory area that the CPU 11 can freely write to at all times. The differences in the sizes of the memory areas depicted in FIG. 1 do not reflect actual differences in the allocated capacities of each memory area in the storage 13, but are for convenience.

The unprotected area 13B stores monitoring applications P1. FIG. 1 representatively shows one of the monitoring applications P1. The monitoring application P1 is designated to monitor tampering caused by unauthorized access from external sources. The protected area 13A stores duplicate applications P2. FIG. 1 representatively shows one of the duplicate applications P2. The duplicate application P2 is a copy of the monitoring application P1 at the point in time when it was stored in the unprotected area 13B. The protected area 13A stores the duplicate application P2 for each monitoring application P1 stored in the unprotected area 13B. For example, when adding a new application at a dealership, the CPU 11 performs the following additional process with administrator privileges in response to the operator's instructions. In the additional process, the CPU 11 stores the new application in the unprotected area 13B as the monitoring application P1. Further, the CPU 11 generates a copy of the monitoring application P1 as the duplicate application P2. Then, the CPU 11 stores the generated duplicate application P2 in the protected area 13A. By performing such an additional process, the CPU 11 causes the unprotected area 13B and the protected area 13A to store a pair of the monitoring application P1 and the duplicate application P2.

In the present embodiment, the monitoring applications P1 stored in the unprotected area 13B are used to control the motion of the vehicle 100. Specifically, one of the monitoring applications P1 is an autonomous driving (AD) application that enables the vehicle 100 to drive autonomously without driver operation. The monitoring applications P1 include applications designed to enable features of advanced driver-assistance systems that support driver operations. Examples of this type of application include lane keeping assist (LKA) applications that maintain lane positioning and adaptive cruise control (ACC) applications that keep a constant distance from the vehicle in front.

Processing Contents of CPU

The CPU 11 functions as a request unit 11A that requests the execution of the monitoring application P1. Additionally, the CPU 11 functions as the management unit 11B that executes the monitoring application P1 and detects any tampering with the monitoring application P1, in response to requests from the request unit 11A.

The request unit 11A intermittently outputs an execution signal for the monitoring application P1, which needs to be executed at the current time, based on information from the information acquisition device 61 and the input device. This execution signal reflects the ID of the monitoring application P1 to be executed and the information on the required processing contents. Upon acquiring an execution signal output from the request unit 11A, the management unit 11B initiates the monitoring process. The monitoring process executes the requested monitoring application P1 while simultaneously monitoring for any tampering with monitoring application P1. The request unit 11A outputs an end signal when a situation arises in which the monitoring application P1 should be terminated after the execution signal is output. The request unit 11A, similar to when outputting the execution signal, outputs the end signal based on the information obtained from the information acquisition device 61 and the input device.

Figure 2:
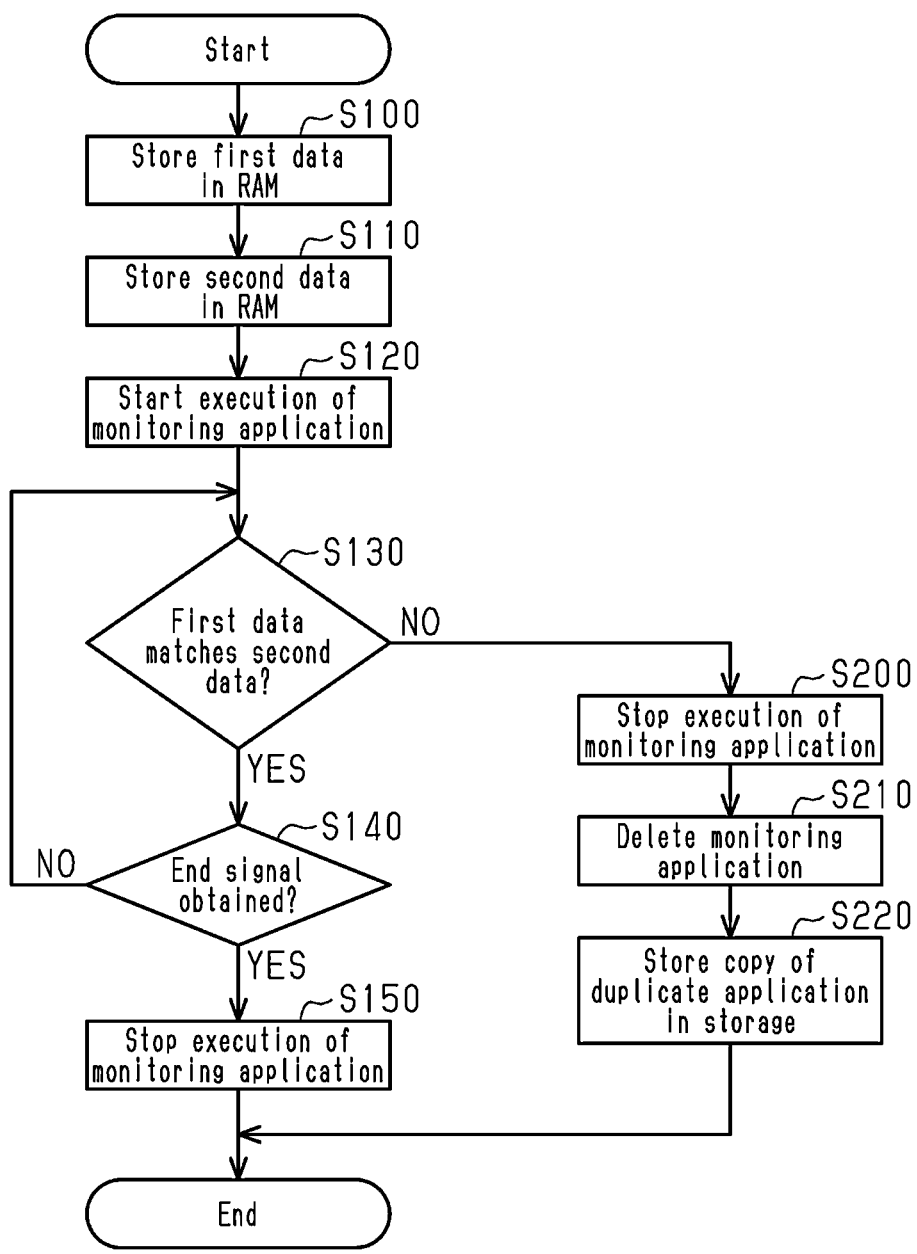
FIG. 2 is a flowchart illustrating a processing procedure of a monitoring process.
Figure 3:
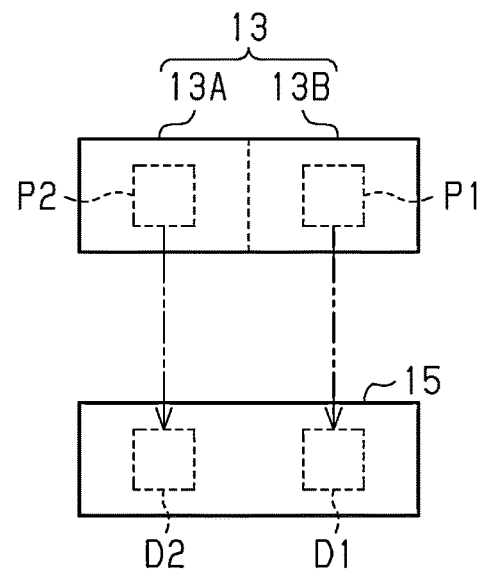
FIG. 3 is a diagram schematically illustrating the processes of step S100 and step S110.
Figure 4:
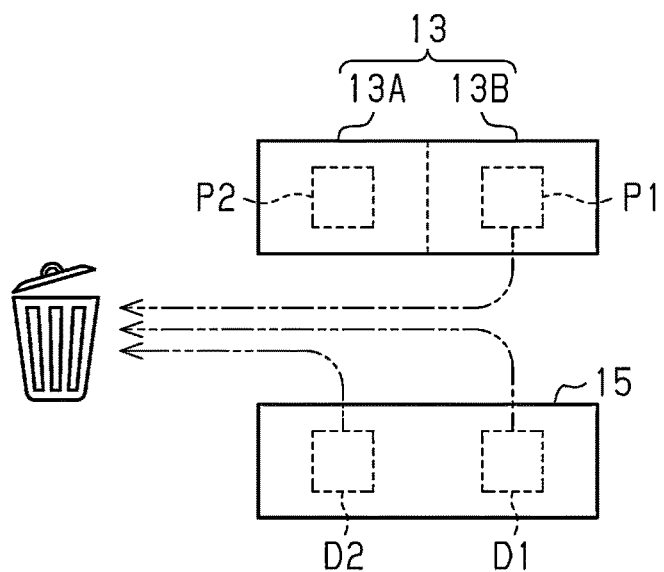
FIG. 4 is a diagram schematically illustrating the process in step S210.
Figure 5:
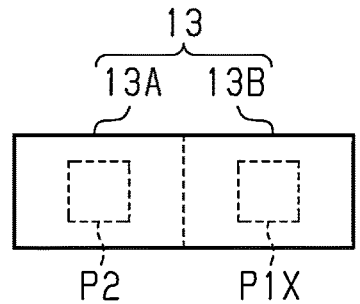
FIG. 5 is a diagram schematically illustrating the process of step S220.

As shown in FIG. 2, the management unit 11B first executes the process of step S100 upon starting the monitoring process. In step S100, the management unit 11B identifies the monitoring application P1 that is subject to execution based on the execution signal. Then, the management unit 11B identifies the monitoring application P1 to be executed from the monitoring applications P1 stored in the unprotected area 13B. Then, the management unit 11B generates a copy of the source code included in this monitoring application P1. As shown in FIG. 3, the management unit 11B stores the generated copy in the RAM 15 as the first data D1. In FIGS. 3 to 5, the other area 13C is not illustrated. A single monitoring application P1 is primarily responsible for multiple processes. In this context, the management unit 11B, when generating the first data D1, produces a copy of the necessary part of the source code corresponding to the process required at the current time, as identified from the execution signal. As shown in FIG. 2, when the management unit 11B stores the first data D1 in the RAM 15, it advances the process to step S110.

In step S110, the management unit 11B performs the same process as in step S100, targeting the duplicate application P2 stored in the protected area 13A. In other words, the management unit 11B, based on the execution signal, identifies the duplicate application P2 that is paired with the monitoring application P1 targeted for execution. Then, the management unit 11B identifies this duplicate application P2 from the duplicate applications P2 stored in the protected area 13A. The management unit 11B generates a copy of the source code included in the identified duplicate application P2 as the second data D2. At this time, the management unit 11B generates the second data D2 based on the source code of the required portion, according to the process required at the current time, as obtained from the execution signal, similar to the process in step S100. Further, as shown in FIG. 3, the management unit 11B stores the generated second data D2 in the RAM 15. As shown in FIG. 2, when the management unit 11B stores the second data D2 in the RAM 15, it advances the process to step S120. Regarding the first data D1 generated in step S100 and the second data D2 generated in step S110, the first data D1 and second data D2 generated based on the same execution signal are copies of the same portion of the source code in the paired monitoring application P1 and duplicate application P2.

In step S120, the management unit 11B starts the execution of the monitoring application P1 to be executed. The management unit 11B refers to the first data D1 stored in the RAM 15 in step S100 when executing the monitoring application P1. That is, the management unit 11B executes the monitoring application P1 based on the first data D1. During the execution of the monitoring application P1, the management unit 11B repeatedly outputs control signals corresponding to the execution of the monitoring application P1 to each required vehicle on-board device 92. Specifically, the management unit 11B generates a control signal for each vehicle on-board device 92 to operate according to the description contents of the first data D1 stored in the RAM 15 in step S100. The management unit 11B sends the generated control signal to the specific controller 90, which controls each vehicle on-board device 92. This is essentially equivalent to outputting the control signal to each vehicle on-board device 92. The management unit 11B repeatedly outputs the control signal to each specific controller 90 at a predetermined first cycle. When the management unit 11B starts the execution of the monitoring application P1, it advances the process to step S130.

In step S130, the management unit 11B compares the first data D1 with the second data D2. At this time, the management unit 11B compares all of the first data D1 with all of the second data D2. Then, the management unit 11B determines whether the first data D1 and the second data D2 match completely. The management unit 11B advances the process to step S140 when the first data D1 and the second data D2 completely match (step S130: YES).

In step S140, the management unit 11B determines whether it has received the end signal from the request unit 11A. When the management unit 11B receives the end signal (step S140: YES), it stops the execution of the monitoring application P1 in step S150, thereby concluding the series of monitoring processes. At this time, the management unit 11B deletes the first data D1 and the second data D2 stored in the RAM 15. When the management unit 11B has not obtained the end signal (step S140: NO), it returns to the process in step S130. Then, the management unit 11B executes the process of step S130 again. The management unit 11B will repeat the processes of step S130 and step S140 when the determination in step S130 is YES and the determination in step S140 is NO. At this time, the management unit 11B is set to repeat the process of step S130 at the second cycle. The second cycle is predetermined to be shorter in length than the aforementioned first cycle.

In step S130, the management unit 11B, when detecting any discrepancies between the first data D1 and the second data D2 (step S130: NO), advances the process to step S200.

In step S200, the management unit 11B stops the execution of the monitoring application P1. The management unit 11B also stores the comparison results obtained in step S130 in the other area 13C of the storage 13. Additionally, the management unit 11B notifies that the execution of the monitoring application P1 will be stopped in relation to the detection of tampering, via the display. Afterward, the management unit 11B advances the process to step S210.

In step S210, as shown in FIG. 4, the management unit 11B deletes the monitoring application P1, which was designated for execution in step S120, from the monitoring applications P1 stored in the unprotected area 13B of the storage 13. Additionally, the management unit 11B deletes the first data D1 and the second data D2 stored in the RAM 15. As shown in FIG. 2, the management unit 11B advances the process to step S220.

In step S220, the management unit 11B stores a new monitoring application P1 in the unprotected area 13B of the storage 13, instead of the monitoring application P1 that was deleted in step S210. Specifically, the management unit 11B generates a copy of the duplicate application P2 identified in step S110 from the duplicate applications P2 stored in the protected area 13A of the storage 13. That is, the management unit 11B generates a copy of the duplicate application P2, which is paired with the monitoring application P1 targeted for execution in step S120. Then, as shown in FIG. 5, the management unit 11B stores the generated duplicate in the unprotected area 13B as a new monitoring application P1X. Further, the management unit 11B performs various configurations, such as setting flags, such that it can execute processes to read this new monitoring application P1X when obtaining an execution signal in the subsequent sessions. Then, the management unit 11B completes the series of monitoring processes. Subsequently, the management unit 11B activates the settings made in step S220 by, for example, rebooting the central controller 10. In FIG. 5, for convenience, the new monitoring application is labeled as P1X to distinguish it from the monitoring application P1 shown in FIG. 4. However, the new monitoring application P1X is identical to the monitoring application P1 before it was tampered with.

Regarding the above-mentioned monitoring process, after the process of step S120, it is possible that the initial determination in step S130 results in NO, causing the process to advance to step S200. With regard to the series of processes from step S120 to step S200 at this time, the management unit 11B is designed to advance processes as follows. The management unit 11B proceeds rapidly from step S130 to step S200 after starting the execution of the monitoring application P1 in step S120, before outputting the initial control signal. Then, the management unit 11B stops the execution of the monitoring application P1 in step S200 before outputting the initial control signal.

Operation of Embodiment

It is assumed that the management unit 11B has obtained an execution signal targeting a specific monitoring application P1 and then the management unit 11B initiates the monitoring process. Then, the management unit 11B compares the first data D1 with the second data D2 (step S130) while executing the specific monitoring application P1 (step S120). Further, when detecting a discrepancy between the first data D1 and the second data D2 (step S130: NO), the management unit 11B stops the execution of the specific monitoring application P1 (step S200) and deletes the specific monitoring application P1 (step S210). Furthermore, the management unit 11B stores the new monitoring application P1X, which is a copy of the duplicate application P2, in the unprotected area 13B of the storage 13 (step S220). Then, the management unit 11B terminates the monitoring process. When obtaining the execution signal targeting the specific monitoring application P1 again, the management unit 11B executes the monitoring process again for the new monitoring application P1X generated in the previous monitoring process.

Advantages of Embodiment (1) The protected area 13A of the storage 13 has a higher security level than the unprotected area 13B because it requires the above-described specific access permissions. Thus, the possibility of the duplicate application P2 stored in this protected area 13A being tampered with due to unauthorized access from external sources is relatively low. Here, the monitoring application P1 is identical with the duplicate application P2. Therefore, the first data D1 and the second data D2, which are generated based on the same execution signal during the monitoring process, should also be identical. Consequently, if a discrepancy is detected between the first data D1 and the second data D2 during the execution of the monitoring application P1, it is highly likely that the following has occurred. That is, it is highly likely that tampering with the monitoring application P1 took place in the unprotected area 13B before the execution of the monitoring application P1, resulting in the first data D1 generated from the tampered monitoring application P1 having a discrepancy with the second data D2. The present embodiment allows such tampering with the monitoring application P1 in the unprotected area 13B to be detected during the execution of the monitoring application P1.

(2) As mentioned above, the possibility of the duplicate application P2 stored in the protected area 13A being tampered with is relatively low. Therefore, even if the monitoring application P1 stored in the unprotected area 13B is tampered with, it is highly likely that the duplicate application P2 stored in the protected area 13A retains the contents of the monitoring application P1 before tampering. Therefore, in the present embodiment, if a discrepancy is detected between the first data D1 and the second data D2 during the execution of the monitoring application P1, a copy of the duplicate application P2 is generated as the new monitoring application P1X. This allows the restoration of the monitoring application P1 to its state before tampering.

(3) Regarding tampering with the monitoring application P1, in addition to tampering with the monitoring application P1 stored in the unprotected area 13B, it is also possible that the first data D1 temporarily stored in the RAM 15 during the monitoring process could be tampered with. In the present embodiment, the comparison between the first data D1 and the second data D2 is repeated during the execution of the monitoring application P1. If a discrepancy is detected between the first data D1 and the second data D2 during these repetitions, tampering with either the first data D1 or the second data D2 is suspected. That is, in the present embodiment, even if the first data D1 or the second data D2 is tampered with during the execution of the monitoring application P1, such tampering can be detected. Moreover, in the present embodiment, the comparison between the first data D1 and the second data D2 is repeated at the second cycle, which is shorter than the first cycle, which is the output cycle of the control signal. Therefore, even if the first data D1 referred to by the management unit 11B during the execution of the monitoring application P1 is tampered with, the tampering can be detected and the execution of the monitoring application P1 can be stopped before the point in time when the control signal is output. This prevents the output of incorrect control signals caused by tampering with the first data D1.

As mentioned above, it is also possible for the second data D2 stored in the RAM 15 to be tampered with. If the second data D2 is tampered with, the detection of tampering through the comparison between the first data D1 and the second data D2 will not be performed correctly. In the present embodiment, if a discrepancy is detected between the first data D1 and the second data D2, the execution of the monitoring application P1 is stopped at that point. Therefore, the execution of the monitoring application P1 will not continue under conditions where tampering cannot be detected.

(4) In the present embodiment, when comparing the first data D1 and the second data D2, all of the first data D1 is compared with all of the second data D2. This ensures that any tampering, as described above, can be detected.

(5) In the present embodiment, one of multiple monitoring applications P1 is an AD application. If this AD application is tampered with, it will be unable to properly control the operation of the vehicle 100 during the execution of the AD application. Executing the AD application through the monitoring process of the present embodiment prevents improper control of the vehicle 100 due to tampering. During the execution of the AD application, the traveling of the vehicle 100 is entirely entrusted to this AD application. Therefore, preventing inappropriate control when executing the AD application is particularly important.

Modifications

The above embodiment may be modified as follows. The above-described embodiment and the following modifications can be combined if the combined modifications remain technically consistent with each other.

The method for determining access permissions to the protected area 13A and the unprotected area 13B is not limited to the examples of the above embodiment. If the condition that writing to the unprotected area 13B can be performed without requiring specific access permissions set for the protected area 13A is satisfied, the method for defining access permissions can be modified. The security level of the protected area 13A simply needs to be higher than that of the unprotected area 13B based on access permissions.

The monitoring application P1 is not limited to controlling the motion of the vehicle 100. The monitoring application P1 may, for example, be used to enable the functioning of a navigation system or to provide entertainment to occupants.

It is not necessary to compare all of the first data D1 and all of the second data D2 in the process of step S130. In other words, in the process of step S130, a portion of the first data D1 may be compared with a portion of the second data D2. In this case, it is sufficient to compare the corresponding portions in the first data D1 and the second data D2.

The second cycle, which is the cycle for repeating the processing in step S130, may be longer than the first cycle.

It is not necessary to compare the first data set D1 with the second data set D2 periodically. During the execution of the monitoring application P1, the monitoring process may be modified to compare the first data D1 with the second data D2 at random points in time. It is sufficient to compare the first data D1 and the second data D2 at least once during the execution of the monitoring application P1.

It is not necessary to create a new monitoring application P1X, which is a copy of the duplicate application P2, when detecting a discrepancy between the first data D1 and the second data D2. When a discrepancy is detected between the first dataset D1 and the second dataset D2, it suffices to stop the running monitoring application P1.

The overall configuration of the vehicle 100 is not limited to the example of the above embodiment. For example, in addition to or instead of an engine. a motor may be included in the vehicle on-board device.

The central controller 10 includes the CPU 11, the storage 13, the RAM 15, and the communication module 17, and executes software processing. However, this is merely exemplary. For example, the central controller 10 may include a dedicated hardware circuit (such as an ASIC) that executes at least part of the software processes executed in the above embodiment. That is, the central controller 10 may be modified to have any one of the following configurations (a) to (c). (a) A configuration including a processor that executes all of the above processes according to programs and a program storage device such as a memory that stores the programs; (b) A configuration including a processor and a program storage device that execute part of the above-described processes according to the programs and a dedicated hardware circuit that executes the remaining processes. (c) A configuration including a dedicated hardware circuit that executes all of the above processes. A plurality of software circuits each including a processor and a program storage device and a plurality of dedicated hardware circuits may be provided. That is, the above processes may be executed in any manner as long as the processes are executed by processing circuitry that includes at least one of a set of one or more software circuits and a set of one or more dedicated hardware circuits. The program storage devices, or computer-readable media, include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information processing device for a vehicle, the information processing device comprising:
an execution unit that includes processing circuitry;
a first memory that stores an application executable by the processing circuitry; and
a second memory that temporarily stores data generated when the processing circuitry executes the application, wherein
the first memory includes:
a protected area that requires a specific access permission for writing; and
an unprotected area that does not require a specific access permission for writing,
the unprotected area stores a monitoring application that is subject to monitoring, the monitoring application is configured to be an AD application that causes the vehicle equipped with the information processing device for the vehicle to autonomously drive without any driver operation,
the protected area stores a duplicate application that is a copy of the monitoring application at a point in time when the monitoring application was stored in the unprotected area, and
the processing circuitry is configured to, when obtaining an execution signal of the monitoring application, perform:
storing, based on the execution signal, as first data in the second memory, a copy of a source code included in the monitoring application stored in the unprotected area, and executing the monitoring application based on the first data stored in the second memory;
storing, based on the execution signal, as second data in the second memory, a copy of a source code included in the duplicate application stored in the protected area;
comparing, during execution of the monitoring application, the first data and the second data stored in the second memory with each other; and
stopping execution of the monitoring application when detecting a discrepancy between the first data and the second data.

2. The information processing device for the vehicle according to claim 1, wherein
the processing circuitry is configured to, when detecting the discrepancy between the first data and the second data, perform:
deleting the monitoring application that has already been stored in the unprotected area; and
storing, in the unprotected area as a new monitoring application, a copy of the duplicate application stored in the protected area.

3. The information processing device for the vehicle according to claim 2, wherein
the processing circuitry is configured to, during the execution of the monitoring application, perform:
repeatedly outputting a control signal corresponding to the execution of the monitoring application to a vehicle on-board device at a predetermined first cycle; and
repeating the comparing the first data and the second data with each other at a second cycle that is predetermined to be shorter than the first cycle.

4. The information processing device for the vehicle according to claim 3, wherein
the processing circuitry is configured to compare all of the first data with all of the second data when comparing the first data with the second data.

* * * * *